US012669411B2

(12) United States Patent
Longanbach et al.

(10) Patent No.: US 12,669,411 B2
(45) Date of Patent: Jun. 30, 2026

(54) NON-CONTACT UNDERCARRIAGE WEAR MEASUREMENT

(71) Applicant: Caterpillar Inc., Peoria, IL (US)

(72) Inventors: David M Longanbach, Peoria, IL (US); Jacob John Pitman, Peoria, IL (US); Benoit Abello, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 54 days.

(21) Appl. No.: 18/942,915

(22) Filed: Nov. 11, 2024

(65) Prior Publication Data

US 2026/0168892 A1    Jun. 18, 2026

(51) Int. Cl.
  *G01M 17/03*      (2006.01)
(52) U.S. Cl.
  CPC ................................... *G01M 17/03* (2013.01)
(58) Field of Classification Search
  CPC .................................................... G01M 17/03
  See application file for complete search history.

(56) References Cited

U.S. PATENT DOCUMENTS

| | | | |
|---|---|---|---|
| 9,238,491 B1 | 1/2016 | Hakes et al. | |
| 9,797,850 B2 * | 10/2017 | Izrailit .................. | G01N 27/22 |
| 2003/0073382 A1 * | 4/2003 | Manor ................ | B28D 5/0058 |
| | | | 451/6 |
| 2008/0218310 A1 * | 9/2008 | Alten ...................... | A43B 3/34 |
| | | | 702/182 |

| | | | |
|---|---|---|---|
| 2012/0043980 A1 * | 2/2012 | Davies ..................... | G01B 7/18 |
| | | | 324/693 |
| 2013/0098139 A1 | 4/2013 | Adams, Jr. | |
| 2015/0066291 A1 * | 3/2015 | Johannsen ............. | B62D 55/32 |
| | | | 701/34.4 |
| 2015/0081166 A1 | 3/2015 | Diekevers | |
| 2015/0149049 A1 * | 5/2015 | Bewley ................. | E02F 9/2883 |
| | | | 37/444 |
| 2015/0159349 A1 | 6/2015 | Horton | |
| 2016/0052572 A1 | 2/2016 | McKinley et al. | |
| 2017/0234775 A1 * | 8/2017 | Finch .................... | G01M 17/03 |
| | | | 702/34 |
| 2018/0276905 A1 * | 9/2018 | Makke ................... | G08C 17/02 |

(Continued)

FOREIGN PATENT DOCUMENTS

| | | |
|---|---|---|
| KR | 20240001945 A | 1/2024 |
| WO | 03093783 A1 | 11/2003 |

*Primary Examiner* — Donald J Wallace
*Assistant Examiner* — Jalal C Coduroglu

(57)      ABSTRACT

A method, a device, and a system for contactlessly measuring wear of one or more components of an undercarriage assembly of a work machine are disclosed. For example, a method includes identifying a component to be measured for wear by a wear measuring device comprising a first sensor and a second sensor; based on the component, selecting component information associated with the component for the wear measuring device; simultaneously measuring: by the first sensor configured based on the component information, a first wear distance from the first sensor to a first measurement surface of the component, and by the second sensor configured based on the component information, a second wear distance from the second sensor to a second measurement surface of the component, and determines a wear level of the component based at least in part on the first wear distance and the second wear distance.

20 Claims, 7 Drawing Sheets

(56) References Cited

U.S. PATENT DOCUMENTS

| 2022/0073113 A1* | 3/2022 | Chung | G01B 11/0691 |
| 2023/0400291 A1* | 12/2023 | Galat | B62D 55/21 |
| 2025/0196950 A1* | 6/2025 | Jones | B62D 55/202 |

* cited by examiner

400

IDENTIFY A COMPONENT TO BE
MEASURED FOR WEAR
402

BASED ON THE COMPONENT, SELECT
COMPONENT INFORMATION ASSOCIATED
WITH THE COMPONENT FOR THE WEAR
MEASURING DEVICE
404

SIMULTANEOUSLY MEASURE THE FIRST
DISTANCE AND THE SECOND DISTANCE
406

DETERMINE A WEAR LEVEL OF THE
COMPONENT BASED AT LEAST IN PART ON
THE FIRST DISTANCE AND THE SECOND
DISTANCE
408

FROM 402

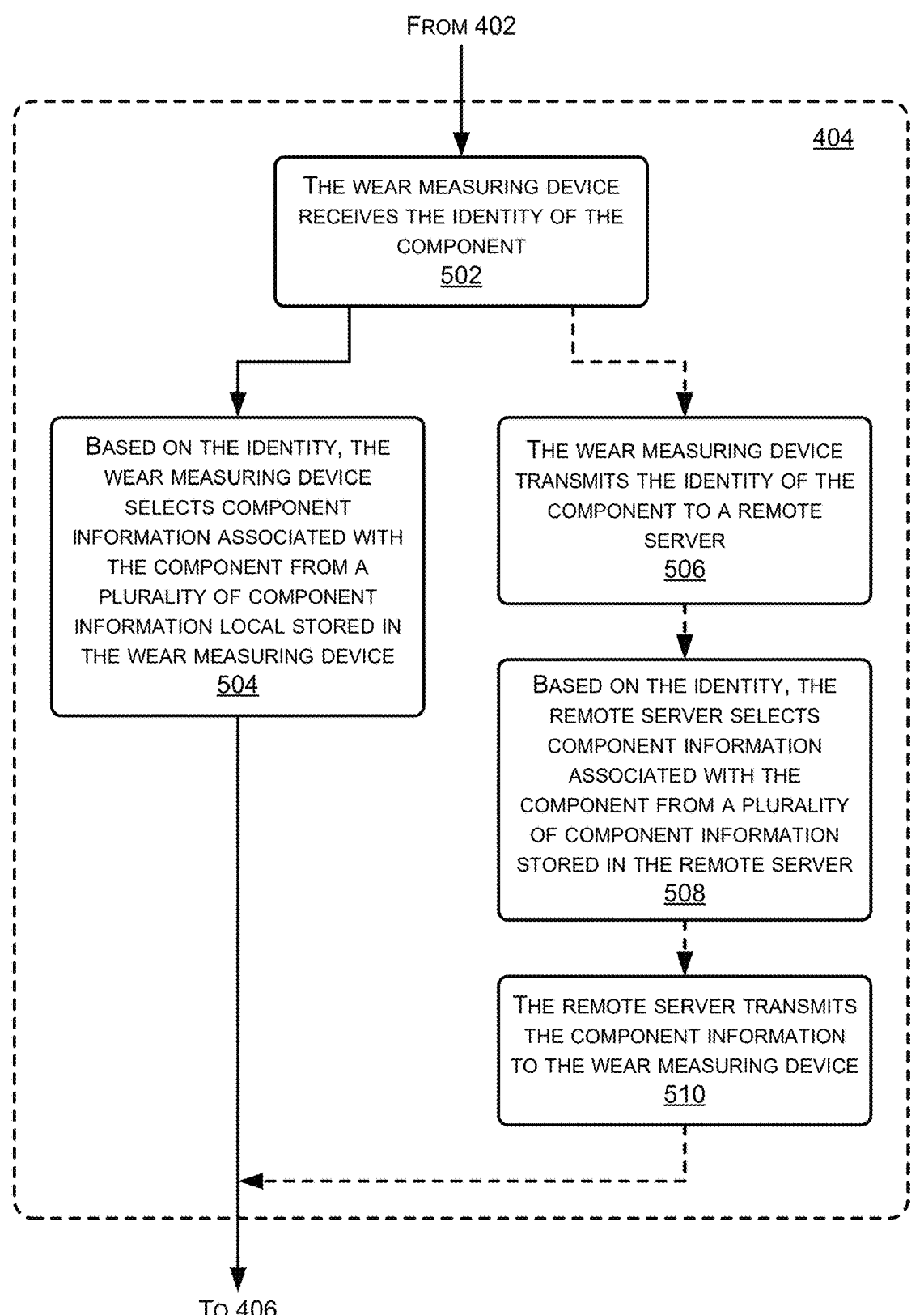

404

THE WEAR MEASURING DEVICE RECEIVES THE IDENTITY OF THE COMPONENT
502

BASED ON THE IDENTITY, THE WEAR MEASURING DEVICE SELECTS COMPONENT INFORMATION ASSOCIATED WITH THE COMPONENT FROM A PLURALITY OF COMPONENT INFORMATION LOCAL STORED IN THE WEAR MEASURING DEVICE
504

THE WEAR MEASURING DEVICE TRANSMITS THE IDENTITY OF THE COMPONENT TO A REMOTE SERVER
506

BASED ON THE IDENTITY, THE REMOTE SERVER SELECTS COMPONENT INFORMATION ASSOCIATED WITH THE COMPONENT FROM A PLURALITY OF COMPONENT INFORMATION STORED IN THE REMOTE SERVER
508

THE REMOTE SERVER TRANSMITS THE COMPONENT INFORMATION TO THE WEAR MEASURING DEVICE
510

From 406

700

NON-CONTACT UNDERCARRIAGE WEAR MEASUREMENT

TECHNICAL FIELD

The present disclosure relates generally to a method, a device, and a system for making undercarriage measurements, and more particularly, to a method, a device, and a system for measuring wear of one or more components of an undercarriage assembly of a work machine without physically contacting portions of the components to be measured for wear.

BACKGROUND

Current undercarriage wear measurement techniques utilize a number of different tools for each component. These tools include an ultrasonic wear indicator (UWI), caliper, depth gauge and tape measure. The UWI is used most often to measure track links, track bushings, track shoes, some idlers, some carrier rollers, and track rollers. While the UWI requires an expensive battery powered device and ultrasonic couplant, the UWI is able to capture ultrasonic measurements automatically and transmit them to a mobile undercarriage inspection application. The caliper is used to physically measure the diameters of rolling components such as carrier rollers and track rollers with a linear scale, and the measured diameters are recorded and used to determine the amount of remaining useful component life. The depth gauge is used to measure linear distances for track links, track bushings, track shoes, idlers, carrier rollers, and track rollers with a linear scale, and the measured linear distances are manually recorded. The tape measure is used to measure linear distances for internal bushing and sprocket wear only, and the measured linear distances are manually recorded. An undercarriage wear inspector must choose and combine these different tools and methods to complete an inspection.

One example of a wear monitoring system is disclosed in Korean Patent Application No. 20240001945 of Lim that was published on Jan. 4, 2024 ("the '945 publication"). In particular, the '945 publication discloses a distance measuring sensor on an upper body of a machine to measure a distance to a track of the machine and determine tension of the track based on the distance. The upper body may turn 180 degrees and the sensor may then be located over an idler to determine the tension of the track over the idler. Although useful in measuring the distance to the track and determining the tension, the '945 publication requires a component to be attached to the machine having the sensor and is limited to measuring the distance to the attached track.

The systems and methods described herein are directed to addressing one or more of the drawbacks of wear measurements for a crawler shoe and associated components set forth above.

SUMMARY

According to a first aspect, a method for contactless measuring a wear level of an undercarriage component is provided. The method includes identifying a component to be measured for wear by a wear measuring device, which has a first sensor and a second sensor. Based the component, the wear measuring device may select component information associated with the component for the wear measuring device, and simultaneously and contactlessly measure a first wear distance from the first sensor to a first measurement surface of the component, by the first sensor configured based on the component information and a second wear distance from the second sensor to a second measurement surface of the component by the second sensor configured based on the component information. The wear measuring device may then determine a wear level of the component based at least in part on the first wear distance and the second wear distance. The wear measuring device may transmit the first wear distance and the second wear distance to a remote, cause the remote server to determine the wear level of the component based on at least in part on the first wear distance and the second wear distance, and receive the wear level of the component from the remote server.

According to another aspect, a wear measuring device for contactlessly measuring a wear level of an undercarriage component is provided. The wear measuring device may include an attachment rail having a first end and a second end opposite the first end, a first sensor slidably mounted on the attachment rail at the first end, a second sensor slidably mounted on the attachment rail between the first sensor and the second end, and a controller mounted on the attachment rail, the controller communicatively coupled to the first sensor and the second sensor. The controller may include one or more processors and memory, coupled to the one or more processors, storing computer executable instructions that, when executed by the one or more processors, cause the one or more processors to perform certain operations. The operations may include: receiving an identity of a component to be measured by the wear measuring device for wear; based on the identity of the component, selecting component information of the wear measuring device for the component; simultaneously and contactlessly measuring, by the first sensor configured on the attachment rail based on the component information, a first wear distance to a first measurement surface of the component, and by the second sensor configured on the attachment rail based on the component information, a second wear distance to a second measurement surface of the component; and determining a wear level of the component based on the first wear distance and the second wear distance According to yet another aspect, a system for contactlessly measuring a wear level of an undercarriage component is provided. The system may include a wear measuring device having a first sensor, a second sensor, and a controller communicatively coupled to the first sensor and the second sensor; and a remote server communicatively coupled to the wear measuring device, the remote server comprising a remote memory storing a plurality of component information. The controller may include one or more processors, and memory coupled to the one or more processors, the memory storing computer executable instructions that, when executed by one or more processors of the controller, cause the one or more processors to perform operations. The operations may include receiving an identity of a component to be measured by the wear measuring device for wear, transmitting the identity of the component to the remote server, causing the remote server to: select component information associated with the component for the wear measuring device from the plurality of component information based on the identity, and transmit the component information to the wear measuring device; receiving the component information; simultaneously and contactlessly measuring: by the first sensor configured based on the component information, a first wear distance to a first measurement surface of the component, and by the second sensor configured based on the component information, a second wear distance to a second measurement surface of the component; transmitting the first wear distance and the second wear distance the remote server; causing the remote server to: determine a wear level of the component based on the first wear distance and the second wear distance, and transmit the wear level to the wear measuring device; and receiving at least one of: the wear level of the component, or a notification that the component is fully worn.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 5 is a flowchart representing an example detail process of one of the blocks of FIG. 4.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. For the purpose of this disclosure, the term "ground surface" is broadly used to refer to all types of surfaces or materials that may be worked in material moving procedures (e.g., gravel, clay, sand, dirt, etc.) and/or can be cut, spread, sculpted, smoothed, leveled, graded, or otherwise treated. In this disclosure, unless stated otherwise, relative terms, such as, for example, "about," "substantially," and "approximately" are used to indicate a possible variation of ±10% in the stated value.

Figure 1:
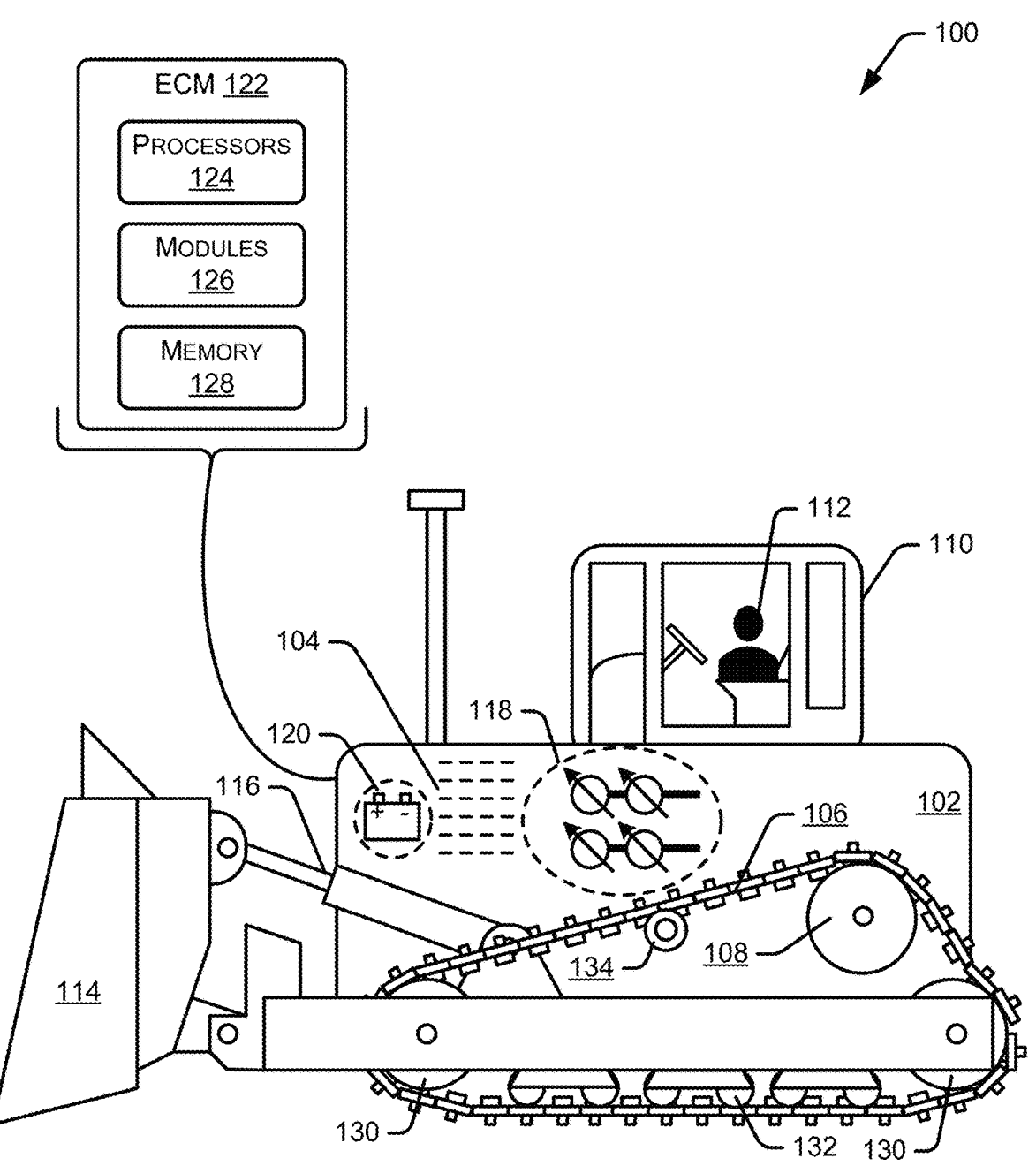
FIG. 1 is a schematic side view of an example machine with tracks.

FIG. 1 is a schematic side view of an example machine 100 with tracks. The example machine 100 shown in FIG. 1 is a dozer. However, the machine 100 may be any type of work machine configured to travel across and perform operations on terrain, such as an agricultural vehicle, and work vehicles, such as a track loader, a track excavator, a paver, a drill rig, and/or any other machine known to a person skilled in the art.

The machine 100 includes a chassis or frame 102 to which an engine 104 as a prime mover is attached. The engine 104 may be an internal combustion engine (ICE), an electric motor, a hybrid comprising an ICE and an electrical engine, or any device or component capable of supplying sufficient power for operating the machine 100. The engine 104 is configured to supply power for operation of the machine 100, including, for example, operating work implements, electronics, and steering, and/or for supplying torque to drive members to propel the machine 100 across the terrain. For example, the machine 100 shown in FIG. 1 includes a propulsion system, such as a pair of tracks 106 (only one set of tracks shown), that are configured to propel the machine 100 across pavement, gravel, dirt, or other work surfaces. The track 106 is driven by a final drive 108.

Although the machine 100 includes the tracks 106, it is contemplated that the machine 100 may include one or more wheels in addition to the tracks 106. The machine 100 also includes a cab 110 operationally connected to the frame 102 for protecting and/or providing comfort for an operator 112 of the machine 100, and/or for protecting control-related devices of the machine 100. In some examples, the machine 100 may be semi-autonomous or fully autonomous, and able to operate without an onboard or remote operator, and may not include the cab 110. In examples where the machine 100 is semi-autonomous or fully-autonomous, the machine 100 is prevented from, or avoids, accidentally colliding with or maneuvering undesirably close to other machines, personnel, and/or objects.

In the example shown in FIG. 1, the machine 100 also includes a work implement 114 for performing operations associated with the machine 100, such as digging, carrying, raising, and/or depositing material. Although the work implement 114 in FIG. 1 is illustrated as a shovel, other forms of work implements are contemplated. For example, the work implement 114 may include augers, brushcutters, brooms, grapples, hammers, pulverizers, rippers, rotors, buckets, and so forth. The machine 100 includes a work implement actuator 116 coupled at one end to the frame 102 and/or to the proximal end of the work implement 114. The work implement actuator 116 may be hydraulic cylinders powered by one or more hydraulic pumps 118. The work implement actuator 116 may also be electric motors or pneumatic cylinders. The work implement actuator 116 is configured to extend and retract, thereby pivoting the work implement 114 between an upright orientation and an at least partially inverted orientation, for example. In the upright orientation, the work implement 114 may hold material and in the at least partially inverted orientation, the work implement 114 may deposit or dump the material.

The machine 100 may include a battery 120 to power various electrical equipment in the machine 100 including an electronic control module (ECM) 122. The ECM 122 houses one or more processors 124, which may execute any modules, components, or systems associated with the machine 100, some of which may be housed in the ECM 122 as shown as modules 126. In some examples, the processors 124 may include a central processing unit (CPU), a graphics processing unit (GPU), both CPU and GPU, or other processing units or components known in the art. Additionally, each of the processors 124 may possess its own local memory, which also may store program modules, program data, and/or one or more operating systems.

Computer-readable media, such as memory 128, associated with the machine 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the machine 100. In some examples, one or more of the modules may include or be associated with computer-executable instructions that are stored by the computer-readable media and that are executable by one or more processors to perform such operations.

A method, a device, and a system disclosed herein may be used for measuring wear of one or more components of an undercarriage assembly of the machine 100 without physically contacting portions of the components to be measured for wear. The components of the undercarriage assembly may include the track 106 comprising a track shoe (not shown) and track link (not shown), the final drive 108, one or more idlers, such as an idler 130, a track roller 132, and a carrier roller 134.

Figure 2:
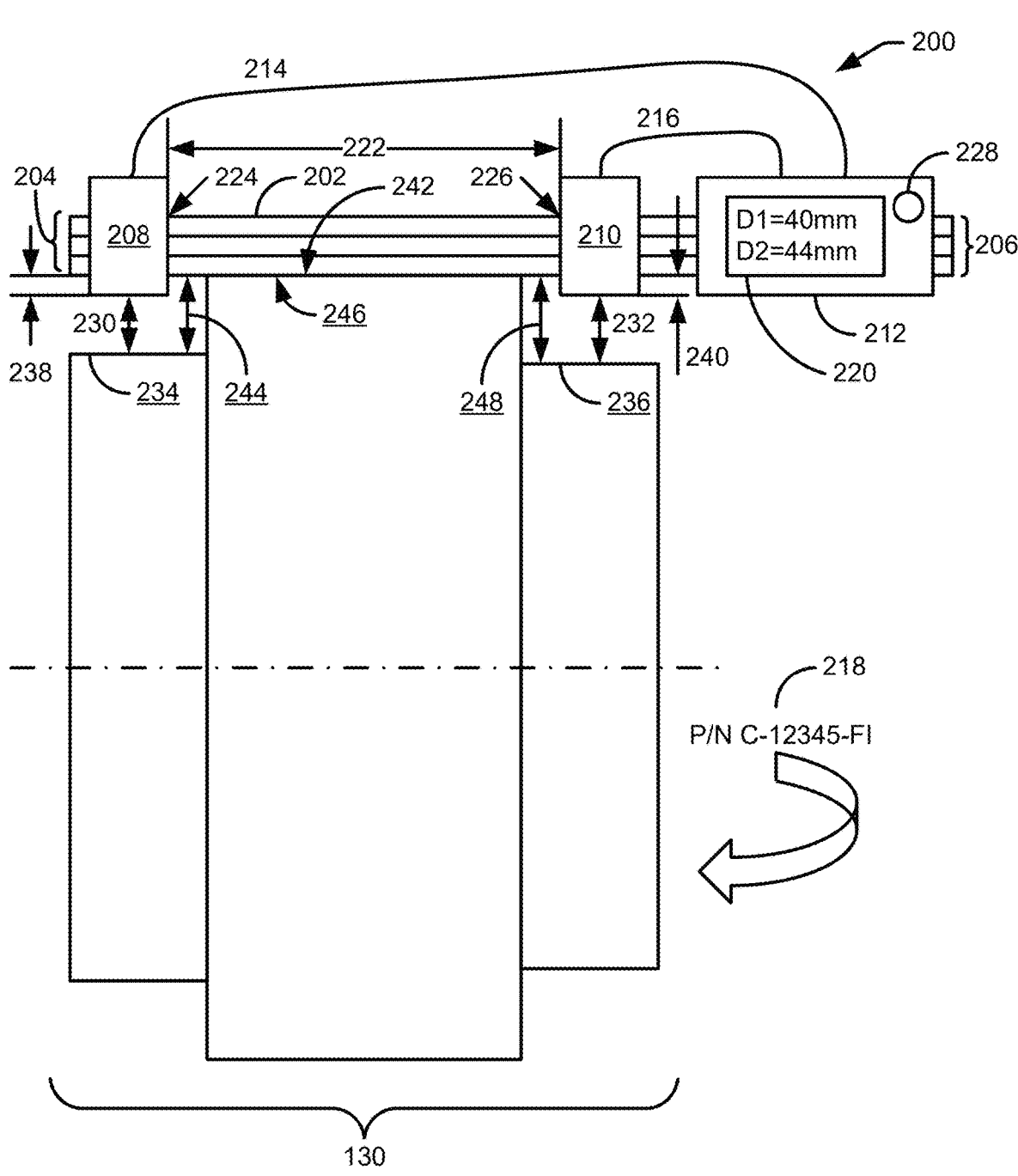
FIG. 2 is a schematic diagram of an example wear measuring device illustrated as measuring wear of a component.

FIG. 2 is a schematic diagram of an example wear measuring device 200 illustrated as measuring wear of a component, such as the idler 130. The wear measuring device 200 may comprise an attachment rail 202 having a first end 204, a second end 206 opposite the first end 204, a first sensor 208 slidably mounted on the attachment rail 202 towards the first end 204, a second sensor 210 slidably mounted on the attachment rail 202 between the first sensor 208 and the second end 206, and a controller 212 mounted on the attachment rail 202 near the second end 206. The controller 212 may be communicatively coupled to the first sensor 208 with a first cable 214 and to the second sensor 210 with a second cable 216. The first sensor 208 and the second sensor 210 may also be coupled to the controller 212 wirelessly. While in this example, two sensors, the first sensor 208 and the second sensor 210, are illustrate, more than two sensors may be utilized for the wear measuring device 200 to measure and determine a wear level of a component.

Because components to be measured vary in size and shape, the wear measuring device 200 is configured, or arranged, to accommodate the size and shape of the component. The component to be measured is first identified, for example, based on at least one of a model number of the component, a serial number of the component (includes type/model info), a part number of the component, a type of the component, or any information that uniquely identifies the component, some of which may be present on the component. In this example, a part number 218 is shown to be present on a side of the idler 130, which identifies the idler 130 as an idler of a certain type having a specific dimensions. Based on the identification, such as the part number 218, component information of the idler 130 for the wear measuring device 200 may be selected. The wear measuring device 200 may then be configured to match, or accommodate, the size and shape of the idler 130, for example, by separating the first sensor 208 and the second sensor 210 by a separation distance 222 based on the component information such that the first sensor 208 and the second sensor 210 may be positioned over respective portions of the idler 130 known, or designed, to wear down. Alternatively, or additionally, the component information may include, or provide, a first placement location 224 on the wear measuring device 200 for the first sensor 208 to be placed and a second placement location 226 on the wear measuring device 200 for the second sensor 210 to be placed.

Based on receiving an activation command, for example, by detecting a measurement activation switch 228 of the controller 212 being pressed, the first sensor 208 may measure a first distance 230 and the second sensor 210 may measure a second distance 232. In other words, the measurements by the first sensor 208 and the second sensor 210 may occur simultaneously and contactlessly. The wear measuring device 200 may utilize contactless measuring sensors, such as time-of-flight, infrared, laser, ultrasound, and the like, sensors, for the first sensor 208 and the second sensor 210. The first sensor 208 may measure the first distance 230 from the first sensor 208 to a first measurement surface 234 of the idler 130, and the second sensor 210 may measure the second distance 232 from the second sensor 210 to a second measurement surface 236 of the idler 130. The first measurement surface 234 and the second measurement surface 236 of the idler 130 may be designed, and/or known, to wear down, and the component information may indicate, or identify, the first measurement surface 234 and the second measurement surface 236. Based on a configuration of the wear measuring device 200, the first sensor 208 and the second sensor 210 may be calibrated to compensate for a first extending portion 238 of the first sensor 208 and a second extending portion 240 of the second sensor 210 beyond a device reference surface 242 of the wear measuring device 200. In other words, the first distance 230 measured is a first wear distance 244 measured from a component reference surface 246 of the idler 130 to the first measurement surface 234 and the second distance 232 measured is a second wear distance 248 measured from the component reference surface 246 to the second measurement surface 236 when the wear measuring device 200 is placed on the component reference surface 246 facing the device reference surface 242. The device reference surface 242 and the component reference surface 246 may also be included, or indicated, in the component information. The first wear distance 244 and the second wear distance 248 may be displayed on the UI 220. In this example, the first wear distance 244 is displayed as "D1=40 mm" and the second wear distance 248 is displayed as "D2=44 mm" on the UI 220.

The first wear distance 244 and the second wear distance 248 may then be evaluated to determine a wear level of the idler 130. For example, when the idler 130 is new and unworn, i.e., 0% wear, the first wear distance 244 and the second wear distance 248 are known to have an unworn distance of 20 mm, and when the idler 130 is fully worn, i.e., 100% worn, the first wear distance 244 and the second wear distance 248 are known to be 50 mm, which may be referred to as a fully worn distance or a threshold distance. When at least one of the first wear distance 244 or the second wear distance 248 is greater than the fully worn distance of 50 mm, the idler 130 may need to be replaced. The first wear distance 244 and the second wear distance 248, individually, or averaged, may be evaluated relative to the unworn and fully worn distances If the first wear distance 244 or the second wear distance 248 exceeds the threshold distance of 50 mm, the UI 220 may also display a notification that the idler 130 has exceeded the fully worn distance. Provided that neither of the first wear distance 244 and the second wear distance 248 exceeds the threshold distance, the wear level may be calculated individually based on the first wear distance 244 and the second wear distance 248, based on the average between the first wear distance 244 and the second wear distance 248, based on an average of distances worn determined based on the first wear distance 244 and the second wear distance 248, or any other meaningful expression to convey the wear level. In this example, the wear level may be displayed on the UI 220 additionally, or alternatively, as "42 mm" as the average of the first wear distance 244 and the second wear distance 248, or "73%," which is the ratio of the average worn distance of 22 mm, (42 mm–20 mm), to the usable range, 30 mm (50 mm–20 mm). Additionally, or alternatively, the first wear distance 244 and the second wear distance 248 may be used to determine a first wear and a second wear, respectively, which indicate an actual distance worn. The first wear and the second wear may be compared to a threshold distance, i.e., a usable wear range of the idler 130, which is 30 mm. If the first wear or the second wear exceeds the threshold distance, the UI 220 may display a notification that the idler 130 is fully worn and needs to be replaced.

Figure 3:
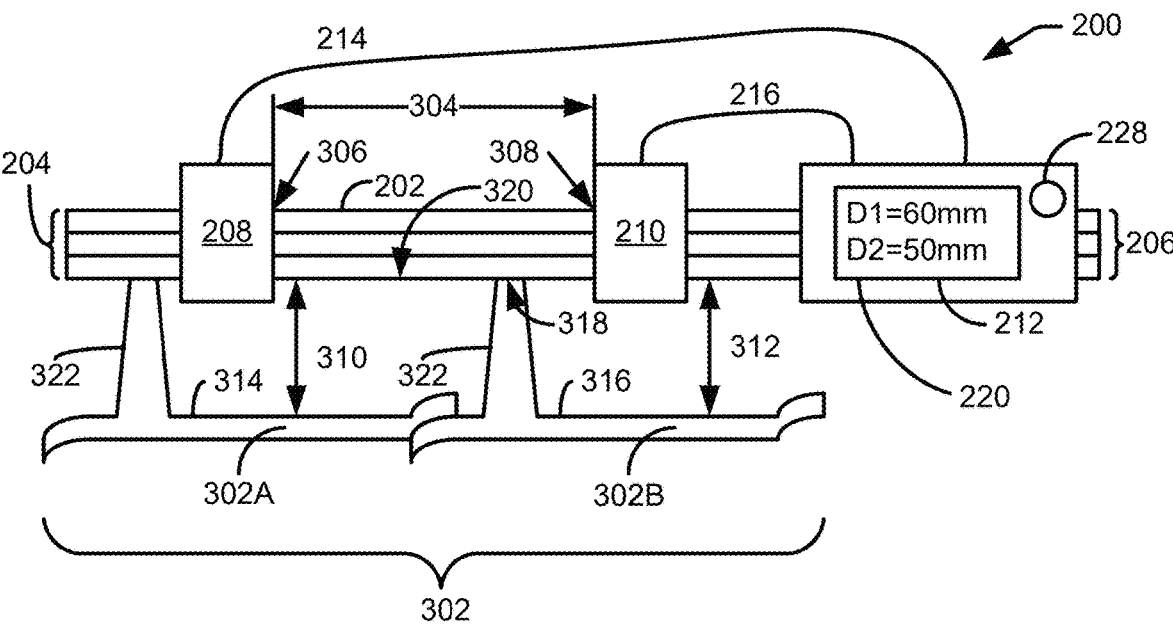
FIG. 3 is a schematic diagram of an example wear measuring device illustrated as measuring wear of another component.

FIG. 3 is a schematic diagram of the wear measuring device 200 illustrated as measuring wear of another component, such as a track shoe 302 of the track 106. Track shoes 302A and 302B of a plurality of track shoes of the track 106 are shown in this example. As discussed above with reference to FIG. 2, based on the identification of the track shoe 302, component information of the track shoe 302 for the wear measuring device 200 may be selected. The component information of the track shoe 302 may include a separation distance 304, a first placement location 306 for the first sensor 208, a second placement location 308 for the second sensor 210, a first wear distance 310, a second wear distance 312, a first measurement surface 314 of the track shoe 302A, a second measurement surface 316 of the track shoe 302B, a component reference surface 318 of the track shoe 302B, and a device reference surface 320 for measuring a wear level of the track shoe 302B. In this example of the track shoe 302, a track ridge 322 of the track shoe 302 is designed to wear, and a top portion of the track ridge 322 of the track shoe 302B may be used as the component reference surface 318 where the device reference surface 320 may rest to make a wear level measurement of the track shoe 302B.

Based on receiving an activation command, for example, by detecting the measurement activation switch 228 of the controller 212 being pressed, the first sensor 208 may measure the first wear distance 310 to the first measurement surface 314 and the second sensor 210 may measure the second wear distance 312 to the second measurement surface 316. The first wear distance 310 and the second wear distance 312 may be displayed on the UI 220. In this example, the first wear distance 310 is displayed as "D1=60 mm" and the second wear distance 312 is displayed as "D2=50 mm" on the UI 220. The first wear distance 310 and the second wear distance 312 may be used to determine a first wear and a second wear, respectively, which indicate an actual distance worn. The first wear and the second wear may be compared to a usable wear range of the track shoe 302. If the first wear or the second wear exceeds a threshold distance, the UI 220 may display a notification that the track shoe 302B is fully worn and needs to be replaced. Provided that neither of the first wear or the second wear exceeds the threshold distance, the wear level may be calculated based on the average between the first wear distance 310 or the second wear distance 312, based on an average of distances worn, i.e., an average of the first wear and the second wear, determined based on the first wear distance 310 and the second wear distance 312, or any other meaningful expression to convey the wear level. For example, the wear level may be displayed on the UI 220 additionally, or alternatively, as "55 mm" as the average of the first wear distance 310 and the second wear distance 312, "60% left," or "40% used" to indicate a usable life ratio of the track shoe 302B.

Figure 4:
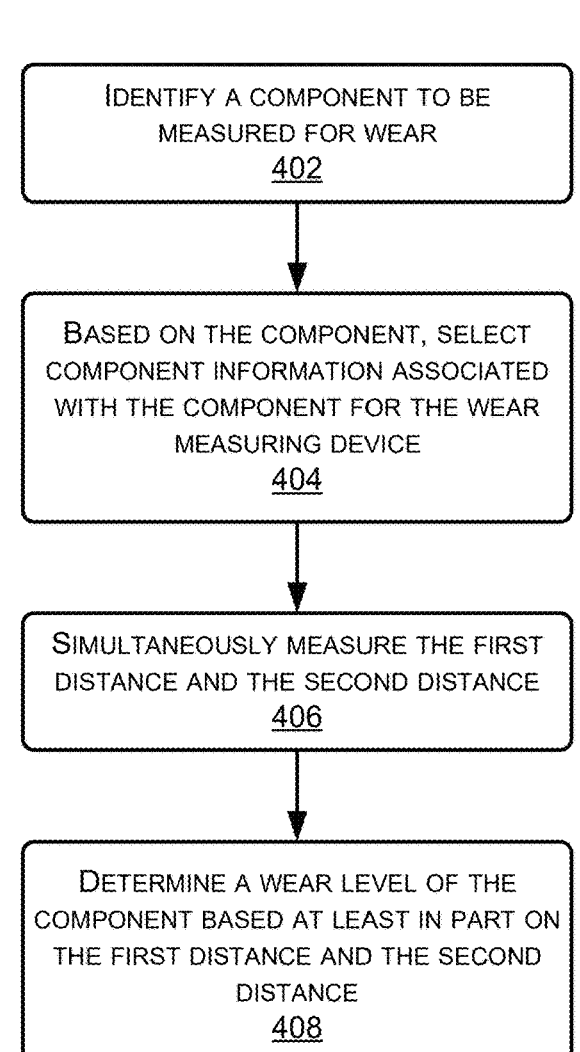
FIG. 4 is a flowchart of an example process for measuring a wear level of a component.

FIG. 4 is a flowchart 400 of an example process for measuring a wear level of a component using a wear measuring device, such as the wear measuring device 200. At block 402, a component, such as the idler 130, to be measured for wear by the wear measuring device 200 may be identified. While the component, i.e., the idler 130, may be visually identified as an idler, there may be several different idlers available with different shapes and sizes.

Therefore, the idler may need to be specifically identified, for example, based on one or more information, such as a model number, a serial number, a part number, or a type of the idler 130, as described above with reference to FIG. 2. Based on the idler 130, now specifically identified, component information associated with the idler 130 for the wear measuring device 200 may be selected at block 404. As described above with reference to FIG. 2, the component information may include information associated with at least one of the component reference surface 246 of the idler 130, the device reference surface 242 of the wear measuring device 200, the separation distance 222 between the first sensor 208 and the second sensor 210, the first placement location 224 on the wear measuring device 200 for the first sensor 208 to be placed, and the second placement location 226 on the wear measuring device 200 for the second sensor 210 to be placed. The component information may be displayed on the UI 220. The first sensor 208 and the second sensor 210 may be automatically located to the first placement location 224 and the second placement location 226, for example, by a servo motor (not shown) of the wear measuring device 200, based on selecting the component information. The wear measuring device 200 may be placed on the idler 130 such that the device reference surface 242 faces and contacts the component reference surface 246 for a correct, or proper, orientation for measuring the wear of the idler 130.

At block 406, the wear measuring device 200 may simultaneously and contactlessly measure the first wear distance 244 by the first sensor 208 located at the first placement location 224 and the second wear distance 248 by the second sensor 210 located at the second placement location 226 as described above with reference to FIG. 2. The wear measuring device 200 may make the contactless simultaneous measurements of the first wear distance 244 and the second wear distance 248 based on receiving an activation command, for example, by detecting a measurement activation switch 228 of the controller 212 being pressed, activating the first sensor 208 and the second sensor 210 simultaneously. At block 408, a wear level of the idler 130 may be determined based at least in part on the first wear distance 244 and the second wear distance 248.

FIG. 5 is a flowchart representing an example detail process of block 404 of FIG. 4. At block 502, the wear measuring device 200 may receive the identity of the component, for example, the part number 218 of the idler 130. Based on the identity, the wear measuring device 200 may select the component information of the idler 130 from a plurality of component information corresponding to a plurality of components at block 504. The plurality of component information may be stored locally in the wear measuring device 200. The process may then proceed to block 406. Alternatively, as shown with dotted arrows, the wear measuring device 200 may transmit the identity of the component, the part number 218 of the idler 130 in this example, to a remote server at block 506. Based on the identity, the remote server may select the component information of the idler 130 from a plurality of component information, stored in the remote server, corresponding to a plurality of components at block 508, and transmit the component information to the wear measuring device 200 at block 510. The process may then proceed to block 406.

Figure 6:
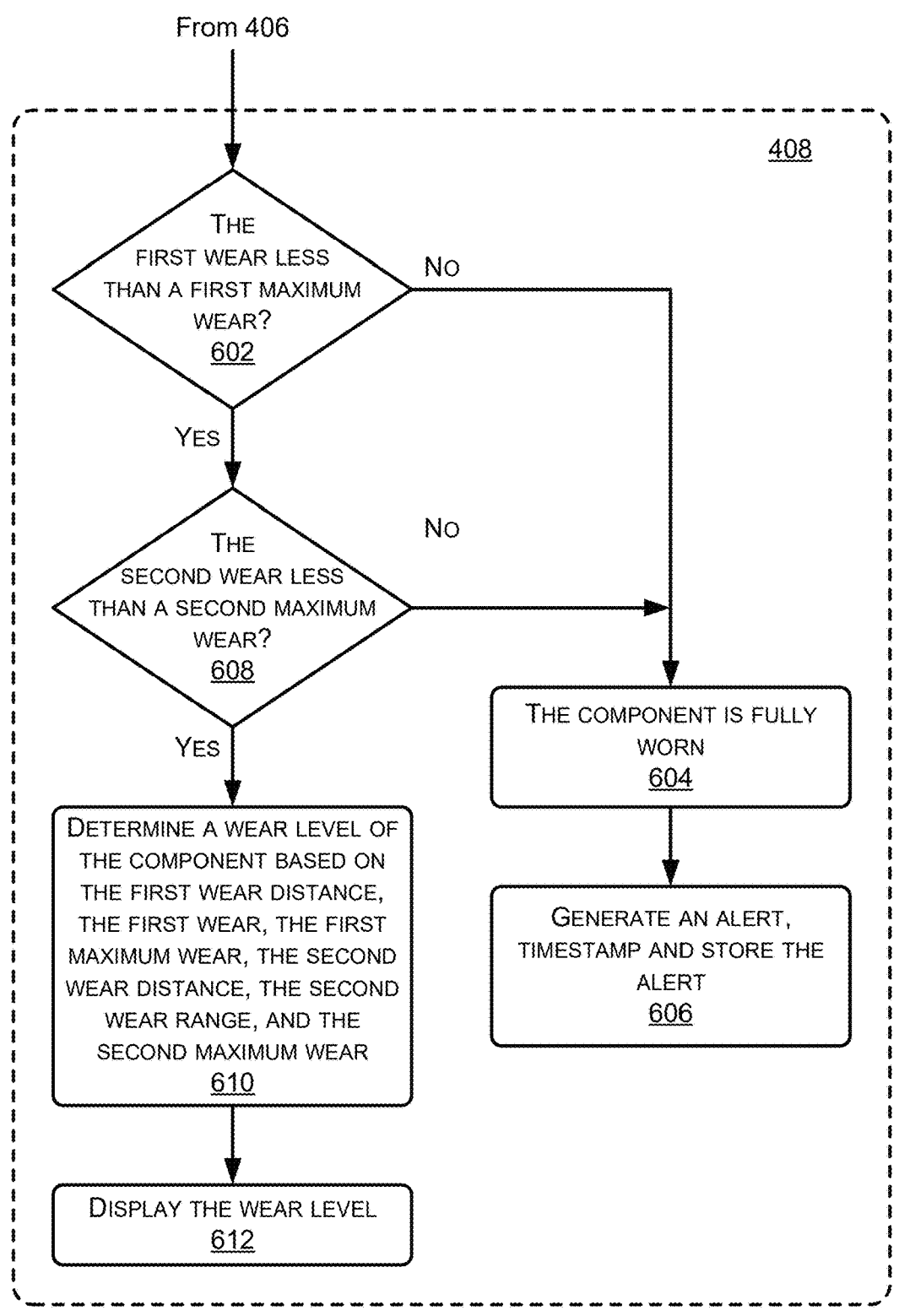
FIG. 6 is a flowchart representing an example detail process of another block of FIG. 4.

FIG. 6 is a flowchart representing an example detail process of block 408 of FIG. 4. At block 602, the wear measuring device 200 may determine whether a first wear is less than a first maximum wear based on the first wear distance 244. For example, the first maximum wear may be a maximum allowable wear at the first measurement surface 234, such 30 mm, i.e., the first measurement surface 234 has worn off 30 mm relative when it was new with 0% wear, as described above with reference to FIG. 2. Based on determining that the first wear is not less than the first maximum wear ("NO" branch), the wear measuring device 200 may determine that the component, i.e., the idler 130, has been fully worn at block 604, and generate an alert, such as "Fully Worn," "Replace Idler," or a similar indication, displayed on the UI 220, and timestamp and store information associated with the alert at block 606. The information associated with the alert may include the first wear distance 244, the second wear distance 248, reasons for replacement, the timestamp, and other information relevant to the determination of the component needing to be replaced. Based on determining that the first wear distance 244 is less than the first maximum wear ("YES" branch), the wear measuring device 200 may determine whether a second wear is less than a second maximum wear based on the second wear distance 248 at block 608. Similar to the first maximum wear, the second maximum wear may be a maximum allowable wear at the second measurement surface 236, and for a symmetric component, such as the idler, the second maximum wear may be the same as the first maximum wear. Based on determining that the second wear is not less than the second maximum wear ("NO" branch), the process proceeds to blocks 604 and 606. Based on determining that the second wear is less than the second maximum wear ("YES" branch), the wear measuring device 200 may determine a wear level of the component based on the first wear distance 244, the second wear distance 248, the first wear, and the second wear at block 610. As described above with reference to FIG. 2, the wear level may be determined and/or expressed as the first wear distance 244, the second wear distance 248, the average of the first wear distance 244 and the second wear distance 248, a percentage of usable life left, or a percentage of usable life used, or any other expression to convey the status of the component. The wear level may then be displayed on the UI 220 at block 612.

While the process of determining the wear level of the component in FIG. 6 is described as performed by the wear measuring device 200, determining the wear level of the component may alternatively, or additionally, involve an external system. For example, the wear measuring device 200 may transmit the first wear distance 244 and the second wear distance 248 to a remote server prior to determining the wear level of the component and causing the remote server to determine the wear level of the component by following the process described above with reference to FIG. 6. The wear measuring device 200 may receive the wear level of the component or a notification that the component is fully worn, defective, or needs to be replaced transmitted by the remote server to the wear measuring device 200. The wear measuring device 200 may display the wear level and/or the notification on the UI 220 as described above with reference to FIG. 6.

Figure 7:
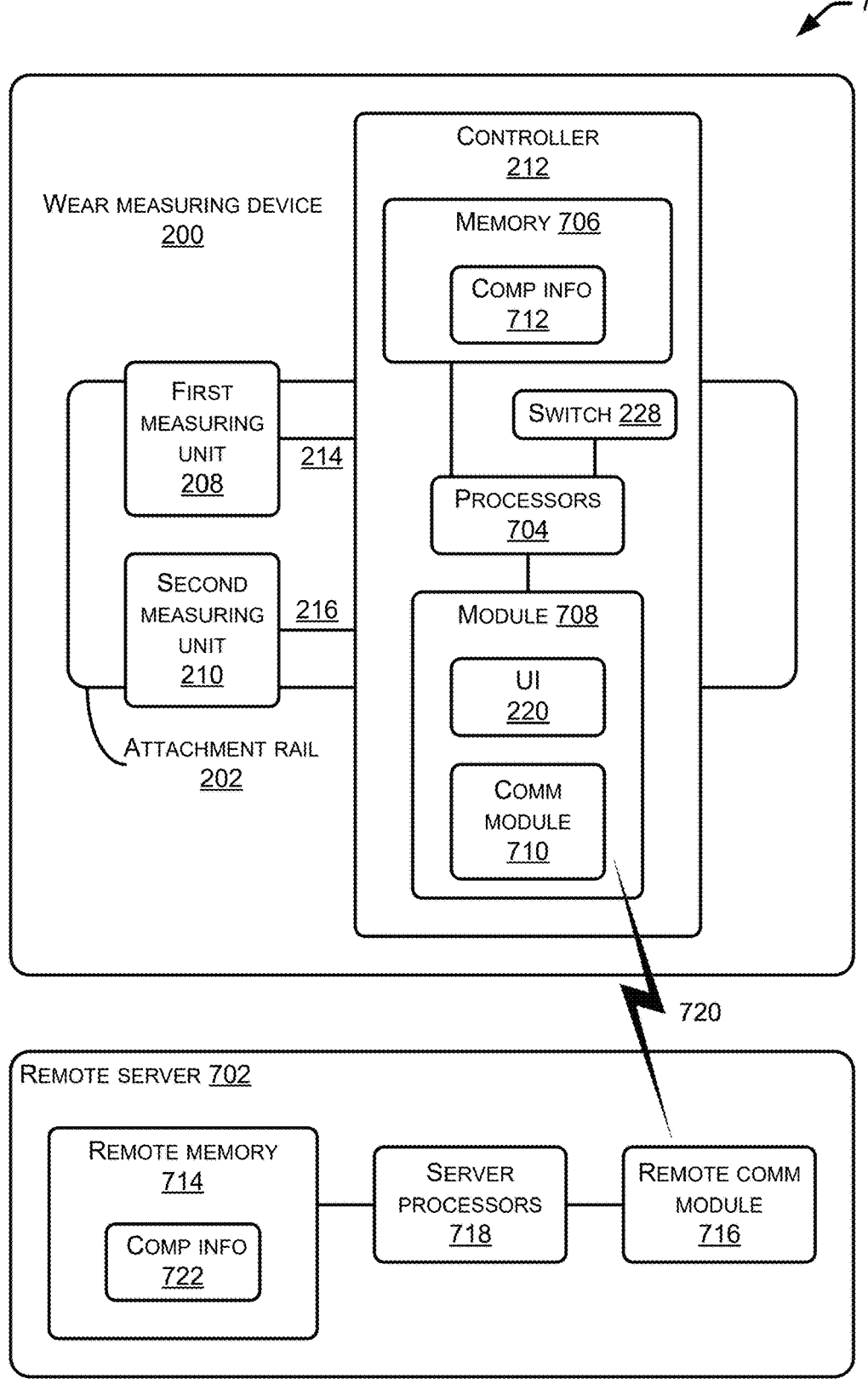
FIG. 7 is a block diagram of a system of the wear measuring device 200 communicatively coupled to a remote server.

FIG. 7 is a block diagram of a system 700 of the wear measuring device 200 communicatively coupled to a remote server 702. The wear measuring device 200 may comprise the first sensor 208, the second sensor 210, and the controller 212 coupled to the first sensor 208 with the first cable 214 and to the second sensor 210 with a second cable 216. The first sensor 208 and the second sensor 210 may be contactless measuring sensors, such as time-of-flight, infrared, laser, ultrasound, and the like, sensors. While the controller 212 is illustrated as being coupled to the first sensor 208 and the second sensor 210 with the first cable 214 and the second cable 216, respectively, in this example, the controller 212 may be couple to the first sensor 208 and the second sensor 210 by utilizing a short range wireless communication protocol, such as Bluetooth, Near Field Communication (NFC), ZigBee, and the like. The wear measuring device 200 may also comprise the attachment rail 202, to which the first sensor 208, the second sensor 210, and the controller 212 may attach. The controller 212 may comprise one or more processors (processors) 704 to perform the methods and processes for determining a wear level of a component as described above with reference to FIGS. 2-6. The controller 212 may additionally comprise a memory 706 communicatively coupled to the processors 704, the measurement activation switch 228 coupled to the processors 704, and the modules 708 communicatively coupled to the processors 704. The modules 708 may include a device communication module 710 and an interface, such as the UI 220 capable of receiving inputs and providing outputs. The inputs and outputs may be communicated to and from the device communication module 710 via a communication network (not shown), which may be a cellular network, Wi-Fi® network, or any other type of network.

The UI 220 may receive the identification, such as the part number 218 of the idler 130, and the processors 704 may select component information of the idler 130 for the wear measuring device 200 from a plurality of component information 712 corresponding to a plurality of components stored locally in the memory 706. The component information includes information relevant to setting, or configuring, the wear measuring device 200 for the component, idler 130 in this example, may include at least one of the separation distance 222 between the first sensor 208 and the second sensor 210, the first placement location 224, the second placement location 226, the first measurement surface 234, the second measurement surface 236, the device reference surface 242, or the component reference surface 246. The processors 704 may receive an activation command, for example, from the measurement activation switch 228 being pressed, and simultaneously activate the first sensor 208 to measure the first wear distance 244 and the second sensor 210 to measure the second wear distance 248. processors 704 may displays the first wear distance 244 and the second wear distance 248 the UI 220. The processors 704 may determine a wear level of the idler 130 based on the first wear distance 244, the second wear distance 248, and the component information as described above with reference to FIG. 2-6, timestamp the wear level, store the timestamped wear level in the memory 706, and display the wear level on the UI 220.

The remote server 702 may comprise a remote memory 714, a remote communication module 716, and one or more server processors (server processors) 718 communicatively coupled to the remote memory 714 and the remote communication module 716. The remote server 702 may also be a mobile device, such as a laptop or tablet computer or a mobile phone. As described above with reference to FIGS. 2-6, the remote server 702 may receive information associated with the component, such as the idler 130, from the wear measuring device 200 and perform some operations. For example, the wear measuring device 200 may transmit, via the device communication module 710, the identity of the component, such as the part number 218 of the idler 130, to the remote server 702, which may receive the identity of the component via the remote communication module 716, as indicated by an arrow 720. Based on the identity, the remote server 702, more specifically, the server processors 718, may select the component information of the idler 130 from a plurality of component information 722, stored in the remote memory 714, corresponding to a plurality of components, and transmit the component information to the wear measuring device 200. Additionally, the wear measuring device 200 may transmit the first wear distance 244 and the second wear distance 248 to the remote server 702 prior to determining the wear level of the component. Alternatively, the first sensor 208 and the second sensor 210 may send the first wear distance 244 and the second wear distance 248 directly to remote server 702. The server processors 718 may then determine the wear level of the component by following the process described above with reference to FIG. 6, and transmit the wear level to the wear measuring device 200. The processors 704 may display the wear level and/or the notification on the UI 220 as described above with reference to FIG. 6.

Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process. The controller 212 may also embody single or multiple microprocessors, field programmable gate arrays (FPGAs), digital signal processors (DSPs), programmable logic controllers (PLCs), etc.

In some examples, the processors 704 may include a central processing unit (CPU), a graphics processing unit (GPU), both CPU and GPU, or other processing units or components known in the art. Additionally, the processors 704 may possess its own local memory, which also may store program modules, program data, and/or one or more operating systems. The memory 706 may comprise computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the wear measuring device 200. In some examples, one or more of the modules may include, or be associated with, computer-executable instructions that are stored by the computer-readable media and that are executable by one or more processors to perform such operations. For example, the memory 706 may store computer-executable, or computer-readable instructions that, when executed by the processors 704 of the controller 212, cause the processors 704 to perform operations according to the methods and processes described above with reference to FIGS. 2-6.

The software and or functionality of the system(s), component(s), algorithms, cloud(s), platform(s), etc., discussed above with reference to FIGS. 2-6 regarding determining a wear level of a component depend on design requirements, ease of construction and/or integration, cost, etc. Accordingly, while these elements have been separated for purposes of discussion, they may be combined, as appropriate, during implementation.

Some or all operations of the methods described above can be performed by execution of computer-readable instructions stored on a computer-readable storage medium, as defined below. The terms "computer-readable medium," "computer-readable instructions," and "computer executable instructions" as used in the description and claims, include routines, applications, application modules, program modules, programs, components, data structures, algorithms, and the like. Computer-readable and -executable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transitory computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media, when executed by one or more processors, may perform operations described above with reference to FIGS. 3-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

INDUSTRIAL APPLICABILITY

The example systems, methods, and devices of the present disclosure are applicable to measuring wear and determining a wear level of a variety of components of an undercarriage assembly of a work machine.

For example, the method identifies a component to be measured for wear by a wear measuring device, which has a first sensor and a second sensor, selects component information associated with the component for the wear measuring device, simultaneously and contactlessly measures a first wear distance by the first sensor configured based on the component information and a second wear distance by the second sensor configured based on the component information, and determines a wear level of the component based at least in part on the first wear distance and the second wear distance. The wear measuring device may also transmit the first wear distance and the second wear distance to a remote server, cause the remote server to determine the wear level of the component, receive the wear level, and display the wear level. The wear level may be displayed, or provided, as the first and second wear distances, the average of first and second wear distances, a percentage of the usable life used or left of the component, or any other useful expression to convey the wear level of the component.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A method comprising:

identifying a component to be measured for wear by a wear measuring device comprising a first sensor and a second sensor;

based on the component, selecting component information associated with the component for the wear measuring device;

simultaneously measuring:

by the first sensor configured based on the component information, a first wear distance from the first sensor to a first measurement surface of the component, and by the second sensor configured based on the component information, a second wear distance from the second sensor to a second measurement surface of the component; and determining a wear level of the component based at least in part on the first wear distance and the second wear distance.

2. The method of claim 1, wherein identifying the component includes determining an identity of the component based on at least one of:

a model number of the component, a serial number of the component, a part number of the component, or a type of the component.

3. The method of claim 2, wherein selecting the component information associated with the component for the wear measuring device includes:

based on the identity of the component, selecting the component information from a plurality of component information associated with to a plurality of components.

4. The method of claim 3, wherein the plurality of component information is stored in a memory of the wear measuring device.

5. The method of claim 3, wherein selecting the component information from the plurality of component information includes:

transmitting the identity of the component from the wear measuring device to a remote server, the remote server including a remote memory storing the plurality of component information; and receiving the component information from the remote server, the component information selected by the remote server from the plurality of component information stored in the remote memory based on the identity of the component.

6. The method of claim 1, wherein the component information includes information associated with at least one of:

a component reference surface of the component, a device reference surface of the wear measuring device to be in contact with the component reference surface for measuring the first wear distance and the second wear distance, a separation distance between the first sensor and the second sensor, a first placement location on the wear measuring device for the first sensor to be placed, and a second placement location on the wear measuring device for the second sensor to be placed.

7. The method of claim 6, wherein:

the first sensor configured based on the component information includes the first sensor being located at the first placement location on the wear measuring device;

the second sensor configured based on the component information includes the second sensor being located at the second placement location on the wear measuring device; and the wear measuring device is placed on the component having the device reference surface facing the component reference surface.

8. The method of claim 1, wherein simultaneously measuring the first wear distance and the second wear distance includes:

based on receiving an activation command, activating the first sensor to measure the first wear distance, and activating the second sensor to measure the second wear distance.

9. The method of claim 1, wherein determining the wear level of the component comprises:

determining whether a first wear is less than a first maximum wear based on the first wear distance;

determining whether a second wear is less than a second maximum wear based on the second wear distance;

based on determining that the first wear is less than the first maximum wear and the second wear is less than the second maximum wear, determining the wear level of the component based at least in part on the first wear distance, the first wear, the first maximum wear, the second wear distance, the second wear, and the second maximum wear; and determining that the component is fully worn based on determining that at least one of:

the first wear is not less than the first maximum wear, or the second wear is not less the second maximum wear.

10. The method of claim 9, further comprising:

transmitting the first wear distance and the second wear distance from the wear measuring device to a remote server prior to determining the wear level of the component;

causing the remote server to determine the wear level of the component based on at least in part on the first wear distance and the second wear distance; and receiving, by the wear measuring device from the remote server, at least one of:

the wear level of the component, or a notification that the component is fully worn.

11. The method of claim 1, wherein the wear measuring device is a contactless wear measuring device utilizing contactless sensors for the first sensor and the second sensor.

12. A wear measuring device comprising:

an attachment rail having a first end and a second end opposite the first end;

a first sensor slidably mounted on the attachment rail at the first end;

a second sensor slidably mounted on the attachment rail between the first sensor and the second end; and a controller mounted on the attachment rail, the controller communicatively coupled to the first sensor and the second sensor, the controller comprising:

one or more processors, and memory coupled to the one or more processors, the memory storing computer executable instructions that, when executed by the one or more processors, cause the one or more processors to perform operations, the operations comprising:

receiving an identity of a component to be measured by the wear measuring device for wear;

based on the identity of the component, selecting component information of the wear measuring device for the component;

simultaneously measuring:

by the first sensor configured on the attachment rail based on the component information, a first wear distance to a first measurement surface of the component, and by the second sensor configured on the attachment rail based on the component information, a second wear distance to a second measurement surface of the component; and determining a wear level of the component based on the first wear distance and the second wear distance.

13. The wear measuring device of claim 12, wherein selecting the component information of the wear measuring device for the component based on the identity of the component includes:

based on the identity of the component, selecting the component information from a plurality of component information of the wear measuring device corresponding to a plurality of components, the plurality of component information stored in a memory of the controller.

14. The wear measuring device of claim 12, wherein the component information includes information associated with at least one of:

a component reference surface of the component, a device reference surface of the attachment rail to be in contact with the component reference surface for measuring the first wear distance and the second wear distance, a separation distance between the first sensor and the second sensor, a first placement location on the attachment rail for the first sensor to be placed, and a second placement location on the attachment rail for the second sensor to be placed.

15. The wear measuring device of claim 12, wherein simultaneously measuring the first wear distance and the second wear distance includes:

receiving an activation command; and based on receiving the activation command, activating the first sensor to measure the first wear distance, and activating the second sensor to measure the second wear distance.

16. The wear measuring device of claim 12, wherein determining the wear level of the component comprises:

determining whether a first wear is less than a first maximum wear based on the first wear distance;

determining whether a second wear a is less than a second maximum wear based on the second wear distance;

based on determining that the first wear is less than the first maximum wear and the second wear distance is less than the second maximum wear, determining the wear level of the component based at least in part on the first wear distance, the first wear, the first maximum wear, the second wear distance, the second wear, and the second maximum wear; and determining that the component is fully worn based on determining that at least one of:

the first wear is not less than the first maximum wear, or the second wear is not less than the second maximum wear.

17. A system comprising:

a wear measuring device having a first sensor, a second sensor, and a controller communicatively coupled to the first sensor and the second sensor; and a remote server communicatively coupled to the wear measuring device, the remote server comprising a remote memory storing a plurality of component information, wherein:

the controller comprises:

one or more processors, and memory coupled to the one or more processors, the memory storing computer executable instructions that, when executed by one or more processors of the controller, cause the one or more processors to perform operations, the operations comprising: receiving an identity of a component to be measured by the wear measuring device for wear, transmitting the identity of the component to the remote server, causing the remote server to: select component information associated with the component for the wear measuring device from the plurality of component information based on the identity, and transmit the component information to the wear measuring device;

receiving the component information;

simultaneously measuring:

by the first sensor configured based on the component information, a first wear distance to a first measurement surface of the component, and by the second sensor configured based on the component information, a second wear distance to a second measurement surface of the component;

transmitting the first wear distance and the second wear distance the remote server;

causing the remote server to:

determine a wear level of the component based on the first wear distance and the second wear distance, and transmit the wear level to the wear measuring device; and receiving at least one of: the wear level of the component, or a notification that the component is fully worn.

18. The system of claim 17, wherein the identity of the component includes at least one of:

a model number of the component, a serial number of the component, a part number of the component, or a type of the component.

19. The system of claim 17, wherein:

the wear measuring device further comprises an attachment rail, and the component information includes information associated with at least one of:

a component reference surface of the component, a device reference surface of the attachment rail to be in contact with the component reference surface for measuring the first wear distance and the second wear distance, a separation distance on the attachment rail between the first sensor and the second sensor, a first placement location on the attachment rail for the first sensor to be placed, and a second placement location on the attachment rail for the second sensor to be placed.

20. The system of claim 17, wherein determining the wear level of the component comprises:

determining whether a first wear is less than a first maximum wear based on the first wear distance;

determining whether a second wear is less than a second maximum wear based on the second wear distance;

based on determining that the first wear is less than the first maximum wear and the second wear is less than the second maximum wear, determining the wear level of the component based at least in part on the first wear distance, the first wear, the first maximum wear, the second wear distance, the second wear, and the second maximum wear; and based on determining that at least one of the first wear is not less than the first maximum wear or the second wear is not less the second maximum wear, determining that the component is fully worn.

* * * * *